United States Patent
Murty et al.

(10) Patent No.: US 7,135,784 B2
(45) Date of Patent: Nov. 14, 2006

(54) FAST TORQUE CONTROL OF A BELTED ALTERNATOR STARTER

(75) Inventors: Balarama V. Murty, West Bloomfield, MI (US); Chandra S. Namuduri, Troy, MI (US)

(73) Assignee: General Motors Corporation, Detroit, MI (US)

( * ) Notice: Subject to any disclaimer, the term of this patent is extended or adjusted under 35 U.S.C. 154(b) by 145 days.

(21) Appl. No.: 10/899,212

(22) Filed: Jul. 26, 2004

(65) Prior Publication Data

US 2006/0017290 A1   Jan. 26, 2006

(51) Int. Cl.
F02N 11/04 (2006.01)
F02N 11/06 (2006.01)
H02P 9/04 (2006.01)

(52) U.S. Cl. .................. 290/36 R; 290/40 R
(58) Field of Classification Search .............. 290/36 R, 290/40 R, 38 R, 46
See application file for complete search history.

(56) References Cited

U.S. PATENT DOCUMENTS

| | | | |
|---|---|---|---|
| 4,959,595 A * | 9/1990 | Nishimura | 318/138 |
| 5,785,138 A * | 7/1998 | Yoshida | 180/65.2 |
| 6,018,199 A * | 1/2000 | Shiroyama et al. | 290/37 A |
| 6,037,753 A | 3/2000 | Uematsu et al. | |
| 6,043,632 A * | 3/2000 | Maehara et al. | 322/28 |
| 6,555,927 B1 * | 4/2003 | Suzuki et al. | 290/34 |
| 6,616,573 B1 * | 9/2003 | McLeod et al. | 477/99 |
| 6,744,146 B1 * | 6/2004 | Fulton et al. | 290/37 A |
| 6,897,574 B1 * | 5/2005 | Vaysse | 290/31 |
| 6,930,404 B1 * | 8/2005 | Gale et al. | 290/40 C |
| 2002/0117934 A1 | 8/2002 | Kanazawa et al. | |
| 2003/0015874 A1 * | 1/2003 | Abe et al. | 290/40 C |
| 2005/0017694 A1 * | 1/2005 | Masson et al. | 322/19 |

\* cited by examiner

Primary Examiner—Julio Gonzalez
(74) Attorney, Agent, or Firm—Kathryn A. Marra

(57) ABSTRACT

A belted-alternator starter system that continuously provides pre-flux when the vehicle ignition is on and the engine is off to provide a faster torque response when the engine is turned on. The alternator/starter device operates as an alternator for providing electrical energy to vehicle electrical devices and the battery when the ignition is on and the engine is running, and operates as a starter for providing engine torque to start the engine when the engine is off and the ignition is on. The system further includes an inverter/rectifier circuit to provide AC current to the armature coils when the alternator/starter device is operating as a starter. The system provides an operating field current to the field coil when the ignition and the engine are on and provides a pre-flux field current to the field coil when the vehicle ignition is on and the engine is off.

17 Claims, 3 Drawing Sheets

FAST TORQUE CONTROL OF A BELTED ALTERNATOR STARTER

BACKGROUND OF THE INVENTION

1. Field of the Invention

This invention relates generally to a belted-alternator-starter (BAS) system for a vehicle and, more particularly, to a BAS system for a vehicle, where the BAS system includes a motor device that receives a minimal field current when the vehicle ignition is on and the engine is off so as to quickly provide engine torque when the engine is restarted.

2. Discussion of the Related Art

Vehicles employ alternators that are driven by a belt coupled to the vehicle engine to provide electrical power. The alternator includes a rectifier to convert AC current to DC current to charge the vehicle battery. The field current of the alternator is regulated to provide the proper battery charge. Particularly, claw-pole, wound rotor AC synchronous devices are used in combination with a rectifier and a field current regulator in vehicles as a belt-driven generator. Permanent magnets have been employed in the claw-pole device to increase the power output and efficiency of the alternator for a given alternator size.

Certain state of the art vehicle designs have investigated using the alternator as a starter motor to start the engine so that the vehicle engine can be turned off when the vehicle is stopped, such as at a stop light, to conserve fuel. These devices are typically known as belted-alternator-starters (BAS). The torque required to start the engine when it is warm is much less than the torque required when the engine is cold. Therefore, a starting device is required to provide the necessary high torque for cold starts. In conventional powertrains, the starter motor provides this torque and starts the engine relatively slowly. Because the alternator is directly connected to the engine by the belt, and thus has a smaller pulley ratio compared to the gear ratio of the starter motor, it has to be designed to produce higher torque not only to take care of cold starts, but also to accelerate the engine quickly so that the starting is transparent to the driver.

In the known vehicles employing a BAS, the three-phases of the AC synchronous alternator are connected to a three-phase active bridge circuit, which functions as a controlled rectifier when the BAS is in the generator mode and as an inverter when the BAS is in the motor mode.

Magnetic flux generated by the permanent magnets and/or the field coil in the rotor induces a current in the armature coils. The interaction of the flux and current gives the alternator its torque. The known BAS system provided the field current and the armature current simultaneously from the power-train controller commands at the start of the vehicle engine. However, the torque response of the engine under this control is unacceptably slow, on the order of 400–600 milliseconds. It would be desirable to provide a BAS that generated the torque more quickly at engine start-up so that the re-starting of the engine at, for example, a stop-light is transparent to the driver of the vehicle.

SUMMARY OF THE INVENTION

In accordance with the teachings of the present invention, a BAS system for a vehicle is disclosed that continuously provides rotor pre-flux when the vehicle ignition is on and the engine is off to provide a faster torque response when the engine is turned on. The BAS system includes an alternator/starter device having a field coil and three armature coils. The alternator/starter device operates as an alternator for providing electrical energy to vehicle electrical devices and the battery when the ignition is on and the engine is running, and operates as a starter for providing engine torque to start the engine when the engine is off and the ignition is on. The BAS system further includes an inverter/rectifier circuit electrically coupled to the armature coils and the battery. The inverter/rectifier circuit inverts the battery power to provide AC current to the armature coils when the alternator/starter device is operating as a starter. The BAS system provides an operating field current to the field coil when the ignition and the engine are on and provides a pre-flux field current to the field coil when the vehicle ignition is on and the vehicle engine is off.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a belted-alternator-starter system employing field coil pre-flux is merely exemplary in nature, and is in no way intended to limit the invention or its applications or uses.

Figure 1:
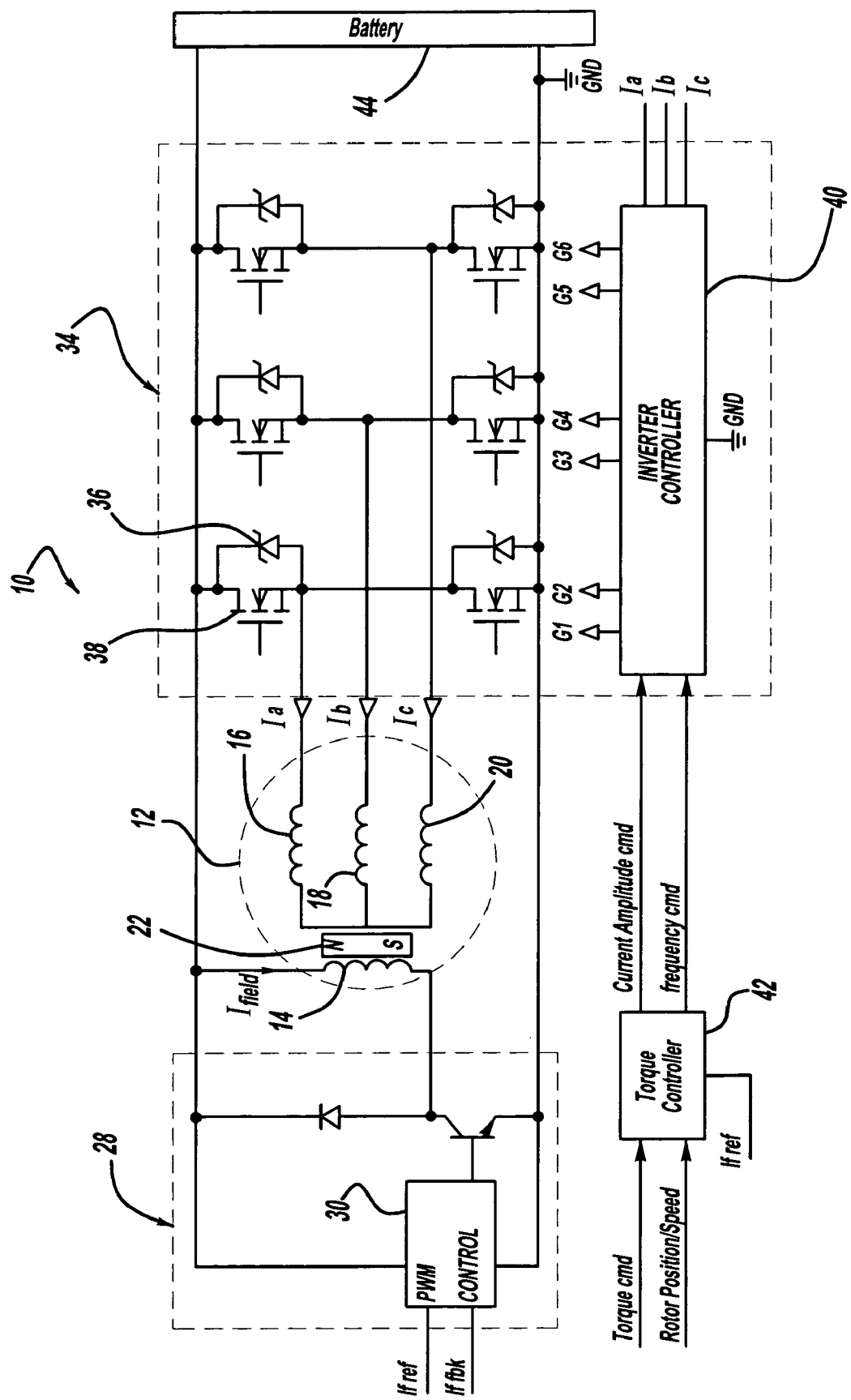
FIG. 1 is a schematic diagram of a belted-alternator-starter system employing a pre-flux control scheme, according to an embodiment of the present invention.

FIG. 1 is a schematic diagram of a belted-alternator-starter (BAS) system 10 that employs a field coil pre-flux, according to an embodiment of the present invention. The BAS system 10 includes a claw-pole motor device 12 including a field coil 14 in the rotor of the device 12 and three AC synchronous armature coils 16, 18 and 20 in the stator of the device 12. Permanent magnets 22 are incorporated in the rotor of the device 12 between the claw-poles to provide additional flux to that produced by the field coil 14, where the total flux is responsible to produce voltage in the armature coils 16–20. The interaction of the magnetic flux provided by the field coil 14 and the permanent magnets 22 with the current in the coils 16–20 produces the torque that drives the engine during start-up. A position/speed sensor (not shown) can be incorporated in the alternator to provide angular information of the rotor poles relative to the armature coils 16–20 and the speed of the rotor relative to the stator.

The BAS system 10 includes a pulse width modulation (PWM) controller 28 having a chopper 30 that controls the field current applied to the field coil 14. Suitable control signals are applied to the chopper 30 to set the pulse width of the field voltage to provide the desired field current required to give the electrical output of the system 10 when it is being used as an alternator when the vehicle engine is running. In the motoring mode of operation with the vehicle ignition on and the engine off, the control signals applied to the chopper 30 set the pulse width of the field voltage to provide the pre-flux value of the field current, as will be discussed below. In the motoring mode when the torque command given is positive to start the engine, the control signals applied to the chopper 30 set the pulse width of the field voltage to provide a starting value of the field current. The operation of a PWM controller in a BAS system is well known to those skilled in the art.

The system 10 includes an inverter/rectifier circuit 34 having a plurality of diodes 36 that rectify the AC current from the coils 16–20 to a DC current to charge a vehicle battery 44 when the engine is on. The inverter/rectifier circuit 34 also includes a plurality of MOSFET switches 38 that are selectively switched on and off to provide the DC to AC inversion to convert the DC battery current to an AC current in the coils 16–20. The system 10 includes a torque controller 42 that receives torque commands and rotor speed commands from the power train controller (not shown) to control the circuit 34 when the system 10 is operating as starter. The torque controller 42 generates a current amplitude command and a frequency command to control the amplitude, frequency and phase of the current flow in the coils 16–20. The torque controller 42 also sets the commanded value of the field current in the field coil 14 to provide the desired engine torque when the engine is running, and sets the field current to a starting value at engine start-up when the induced voltage is near zero.

It is noted that when the system 10 is in the motoring mode, the torque command is positive and when the system 10 is in the generating mode, the torque command is negative. When the torque command is positive and the engine is off, the field current reference is changed from a pre-flux value to a higher starting value when the controller receives an engine start command. When the torque command is negative in the generating mode, the field current reference value is adjusted depending on the load, the battery state of charge and the bus voltage.

An inverter controller 40 within the inverter/rectifier circuit 34 receives the current amplitude command and the frequency command, and generates control signals G1–G6 that switch the switches 36 on and off to provide the desired AC inversion. An inverter/rectifier circuit of this type used in a BAS system is well known to those skilled in the art.

When the engine is restarted in the known BAS systems, the switches 38 are selectively turned on and off to provide AC current to the coils 16–20 at the same time that the field current is applied to the field coil 14. However, because the field flux generated by the field current takes a relatively long time to build up, the torque available to drive the engine at start-up also takes a relatively long time to ramp up because the amount of torque available is directly related to the field current. Particularly, the field flux multiplied by the armature current determines the torque.

According to the invention, the inability to quickly provide torque in a BAS system is mitigated by providing a pre-flux current in the device 12. This is accomplished by continually maintaining a field current in the field coil 14 when the ignition is on and the engine is off, so that there is always a flux present. When the engine is stopped, the PWM controller 28 provides a minimal current through the field coil 14 so that when the engine is commanded to start, there is already flux available in the device 12 that can immediately provide torque when the armature current in the coils 16–20 is turned on and the field current is commanded to the higher starting value. In this embodiment, the permanent magnets 22 provide additional magnetic flux between the field coil 14 and the armature coils 16–20. Because the permanent magnets 22 also provide flux, the amount of pre-flux current applied to the coil 14 when the engine is off can be reduced. In an alternate embodiment, the magnets 22 can be eliminated, however, more pre-flux current in the coil 14 may be required to provide the same engine torque response at start-up. In either embodiment, the field coil current is set to a higher starting value when a start engine command is received by the controller. The field current in the alternator mode after the engine is started is, however, adjusted depending on the bus voltage and the state of the charge of the battery 44 in a conventional manner.

Figure 2:
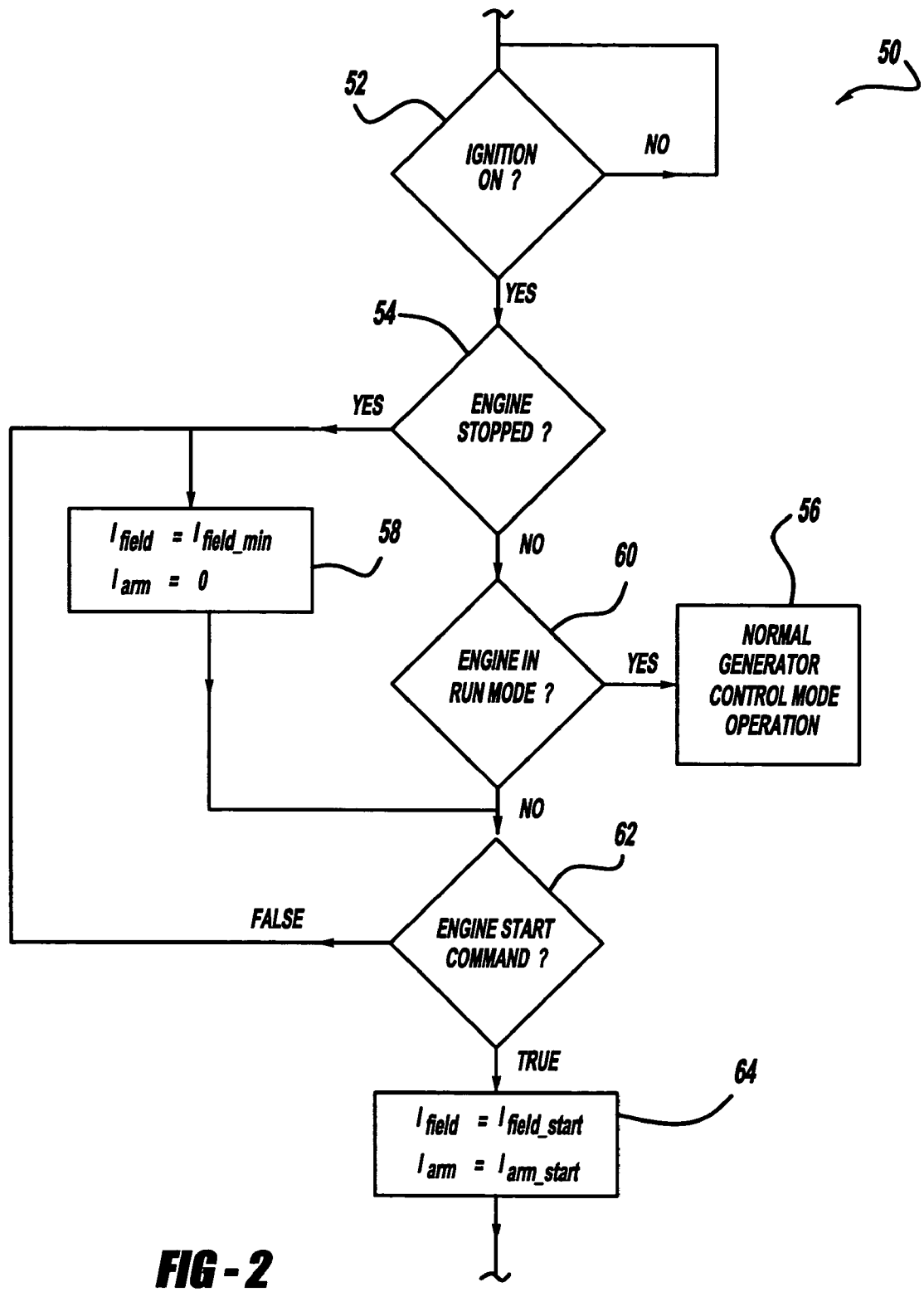
FIG. 2 is a flow chart diagram showing the operation of the pre-flux control scheme of the belted-alternator-starter system of the invention.

FIG. 2 is a flow chart diagram 50 showing the operation of the BAS system 10 of the invention. The system 10 determines whether the vehicle ignition is on at decision diamond 52. If the ignition is on, the system 10 then determines if the engine is stopped at decision diamond 54. If the engine is not stopped, then the system 10 determines whether the engine is in the run mode at decision diamond 60. If the engine is in the run mode, the system 10 sets the field current in the coil 14 and the armature current in the coils 16–20 to the normal operation values based on the control signals sent to the control boxes 30 and 40 for an alternator at box 56. If the system 10 determines that the engine is stopped at the decision diamond 54, it sets the armature current to zero, $I_{arm}=0$, and the field current in the coil 14 to a predetermined minimum value, $I_{field\_min}$, at box 58 to provide the pre-flux current. The field current is maintained at the minimum value $I_{field\_min}$ while the engine is off and the ignition is on. The system 10 then determines when the engine receives a start command at decision diamond 62. If the start command is given, the system 10 sets the armature current and the field current to predetermined start current values $I_{arm\_start}$ and $I_{field\_start}$, respectively, at box 64. If there is no engine start command at the decision diamond 62, the armature current is set to zero, $I_{arm}=0$, and the field current in the coil 14 is set to the predetermined minimum value $I_{field\_min}$ at the box 58. After the start currents $I_{arm\_start}$ and $I_{field\_start}$ are provided, the algorithm continues to perform other system checks and control functions not shown until it loops back to the box 52.

Figure 3:
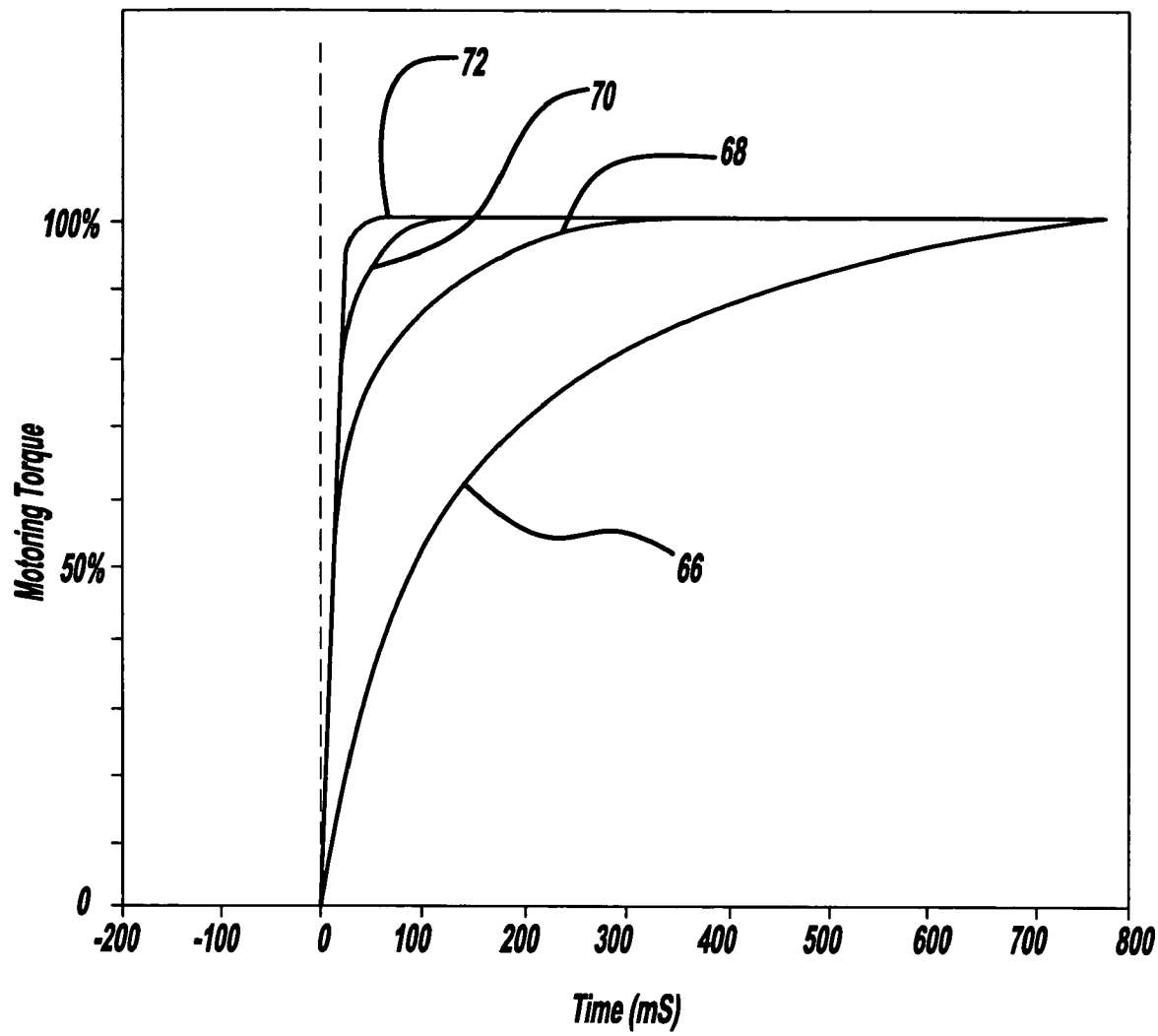
FIG. 3 is a graph with time on the horizontal axis and motoring torque on the vertical axis showing the torque response time for different applied rotor pre-fluxes.

The pre-flux current can be any current suitable for the purposes described herein. FIG. 3 is a graph with time on the horizontal axis and motoring torque on the vertical axis showing representative examples of different pre-flux currents for the field coil 14. Graph line 66 shows when the engine torque reaches the desired motoring torque with no pre-flux current applied to the field coil 14, and is representative of the prior art. Graph line 68 shows how fast the engine torque reaches the desired motoring torque with a pre-flux current of 0.25 amps applied to the coil 14; graph line 70 shows how fast the engine reaches the desired motoring torque with a pre-flux current of 0.5 amps applied to the coil 14; and graph line 72 shows how fast the engine reaches the desired motoring torque with a pre-flux current of 1.0 amps applied to the coil 14. As is apparent, by applying a pre-flux current to the coil 14, the motoring torque comes up much quicker than those systems known in the art.

It should be noted that beyond a pre-flux field current of 0.5 amps, there is no significant improvement in the torque response time. In order to minimize the BAS system's losses during engine stop with the ignition on, it is desirable to provide the minimum pre-flux field current that achieves the desired torque response. Other BAS systems may have other optimal pre-flux currents.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A belted-alternator-starter system for a vehicle, said vehicle including an ignition, an engine, electrical devices and a battery, said system comprising:
    an alternator/starter device including a field coil and a plurality of armature coils, said alternator/starter device operating as an alternator for providing electrical energy to the electrical devices and the battery when the ignition is on and the engine is on and operating as a starter for providing engine torque to start the engine when the engine is off and the ignition is on;
    an inverter/rectifier circuit electrically coupled to the plurality of armature coils and the battery, said inverter/rectifier circuit inverting the battery power to provide AC current to the plurality of armature coils when the alternator/starter device is operating as a starter; and
    a control device, said control device providing an operating field current to the field coil when the ignition and the engine are on and providing a pre-flux field current to the field coil when the vehicle ignition is on and the vehicle engine is off, wherein the pre-flux field current corresponds to a predetermined current that achieves a desired starting torque response in a motoring mode while limiting the battery current drawn when the engine is off.

2. The system according to claim 1 wherein the pre-flux field current is between 0.25 and 1.0 amps.

3. The system according to claim 2 wherein the pre-flux field current is about 0.5 amps.

4. The system according to claim 1 wherein the alternator/starter device includes permanent magnets between claw-poles.

5. The system according to claim 1 wherein the plurality of armature coils is three armature coils.

6. The system according to claim 1 wherein the alternator/starter device is a three-phase AC synchronous machine and the rectifier/inverter device is a three-phase active bridge circuit.

7. The system according to claim 6 wherein the alternator/starter device is a claw-pole device.

8. A belted-alternator-starter system for a vehicle, said vehicle including an ignition, an engine, electrical devices and a battery, said system comprising:
    a claw-pole AC synchronous three-phase machine including a field coil and permanent magnets in a rotor of the machine and three armature coils in a stator of the machine, said machine operating as an alternator for providing electrical energy to the electrical devices and the battery when the ignition is on and the engine is on and operating as a starter for providing engine torque to start the engine on demand when the engine is off and the ignition is on;
    a three-phase active bridge circuit electrically coupled to the armature coils and the battery, said bridge circuit rectifying AC current from the machine to charge the battery when the machine is operating as an alternator and inverting the battery power to provide AC current to the armature coils when the machine is operating as a starter; and
    a control device, said control device providing an operating field current to the field coil when the ignition and the engine are on and providing a pre-flux field current to the field coil when the vehicle ignition is on and the vehicle engine is off and maximum field current with an engine start command, wherein the pre-flux field current corresponds to a predetermined current that achieves a desired starting torque response in a motoring mode while limiting the battery current drawn when the engine is off.

9. The system according to claim 8 wherein the pre-flux field current is between 0.25 and 1.0 amps.

10. The system according to claim 9 wherein the pre-flux field current is about 0.5 amps.

11. A method of providing pre-flux in a belted-alternator-starter system for a vehicle, said vehicle including an ignition, an engine, electrical devices and a battery, said method comprising:
    providing an alternator/starter device including a field coil and at least one armature coil;
    operating the alternator/starter device as an alternator for providing electrical energy to the electrical devices and the battery when the ignition is on and the engine is on;
    operating the alternator/starter device as a starter for providing engine torque to start the engine when the engine is off and the ignition is on;
    providing an operating field current to the field coil when the ignition and the engine are on; and
    providing a pre-flux field current to the field coil when the vehicle ignition is on and the vehicle engine is off, wherein providing a pre-flux field current to the field coil includes providing a pre-flux field current corresponding to a predetermined current that achieves a desired starting tongue response in a motoring mode while limiting the battery current drawn when the engine is off.

12. The method according to claim 11 wherein providing a pre-flux field current to the field coil includes providing a pre-flux field current to the field coil in the range of 0.25 to 1.0 amps.

13. The method according to claim 12 wherein providing a pre-flux field current to the field coil includes providing a pre-flux current to the field coil of about 0.5 amps.

14. The method according to claim 11 wherein operating the alternator/starter device as a starter includes inverting the battery power to provide AC current to at the least one armature coil.

15. The method according to claim 11 wherein providing an alternator/starter device includes providing an alternator/starter device with permanent magnets.

16. The method according to claim 11 wherein providing an alternator/starter device includes providing a three-phase AC synchronous machine.

17. The method according to claim 16 wherein providing an alternator/starter device includes providing a claw-pole device.

* * * * *